Patented Mar. 8, 1938

2,110,489

UNITED STATES PATENT OFFICE 2,110,489

MANUFACTURE OF SYNTHETIC RESINS

Wilhelm Kraus and Willi Fisch, Basel, Switzerland, assignors to Society of Chemical Industry in Basle, Basel, Switzerland No Drawing. Application May 15, 1935, Serial No. 21,683. In Switzerland May 29, 1934

4 Claims. (Cl. 260—3)

The present invention is concerned with urea-formaldehyde resins. It relates both to their manufacture and to their use in the industry of plastic masses, lacquers, adhesives and the like.

In specification Ser. No. 725,660 now Patent No. 2,033,718 there is described a process of making condensation products incapable of being hardened from urea, formaldehyde and hexamethylenetetramine. In specification Ser. No. 699,463, now Patent No. 2,077,841 it is shown that such products incapable of being hardened can be converted into a form capable of being hardened by further addition of urea and formaldehyde.

The present invention relates to a process in which such condensation products incapable of being hardened, particularly those which contain per 1 molecular proportion of the urea less than 1 molecular proportion of formaldehyde and less than 0.1 molecular proportion of hexamethylenetetramine, are converted into products capable of being hardened by an addition of formaldehyde alone. This process is completely new in the art of making urea-formaldehyde condensation products and leads to entirely new possibilities in the manufacture.

The products which are incapable of being hardened are preferably made by condensing 1 molecular proportion of urea with less than 1 molecular proportion but not substantially less than $\frac{1}{2}$ molecular proportion of formaldehyde and less than 0.1 molecular proportion but not essentially less than $\frac{1}{50}$ molecular proportion of hexamethylenetetramine, with or without the use of an acid catalyst. If the acid catalyst is added at the beginning the hydrogen-ion concentration in the formaldehyde may be greater than corresponds with a pH-value of 3. The several materials may be added all at once or in doses.

Instead of urea, a mixture of urea and thiourea or other substances which react with formaldehyde, such as phenols, amides and amines, for example toluenesulfamide, acetamide, formamide, oxamide, urethane and aniline, may be used.

The solutions of the products which cannot be hardened may be concentrated or evaporated to dryness. The solutions, as well as the dry powders, may be stored for any length of time. This is the great advantage of the products incapable of being hardened, namely that they may be treated without special precautions, since, unlike the products which are capable of being hardened, they are not liable to become hard during the manufacture or storage.

For converting the products which are incapable of being hardened into those which are capable of being hardened, the former are mixed with formaldehyde, with or without application of heat, in such a proportion that the molecular ratio between urea and formaldehyde ranges from 1:1 to 1:2, a molecular ratio of 1:1.5 being preferred. The solution thus obtained may be worked up directly or may be still further condensed. The formaldehyde may be added either in one batch or in portions; it may also be added at least in part in the form of its dry polymeride only just before the operation of grinding the material to molding powder. If the acid catalyst is to be added first to the solution capable of being hardened, it is advantageous to dissolve it in the formaldehyde to be added, whereby the hydrogen-ion concentration in the formaldehyde may exceed that corresponding with a pH-value of 3. The final products are profoundly improved by this addition of the catalyst from the beginning or in stages. As catalyst, oxalic acid or phosphoric acid come into consideration; or, indeed, any other organic or inorganic acid or a body which yields acid. After or during the condensation a part or the whole of the acid may be neutralized.

As solvents there may be used water or non-aqueous liquids or mixtures of both.

The following examples illustrate the invention, the parts being by weight:—

Example 1

450 parts of urea (7.5 mol.), 190 parts of thiourea (2.5 mol.) and 94 parts of hexamethylenetetramine (0.67 mol.) are dissolved in 500 parts of formaldehyde of 30 per cent. strength (5 mol.) and the solution is mixed with 4 parts of oxalic acid. From this solution, at 60–70° C. under diminished pressure, water is distilled during 1 hour, and the residue is further condensed at 60° C. during 1–20 hours. The product thus obtained is mixed in the cold with 1000 parts of formaldehyde solution of 30 per cent. strength (10 mol.) and kneaded with cellulose, the kneaded mixture then being dried and ground. The powder is pressed in a hot mold; it exhibits a very good flow under a pressure of 100–200 kilos per sq. cm. and, already after a molding time of 1–3 minutes at about 140° C., the mass may be ejected as a very hard and highly lustrous body which is also very stable to the attack of hot and cold water.

Example 2

120 parts of urea (2 mol.) and 14 parts of hexamethylenetetramine (0.1 mol.) are dissolved in 100 parts of formaldehyde solution of 30 per cent. strength (1 mol.) and the solution is distilled for 2 hours at 70-80° C. in a vacuum. There is produced a clear liquid of alkaline reaction which is mixed with 200 parts of formaldehyde of 30 per cent. strength (2 mol.) and the mixture is kept for half-an-hour at 60° C. The solution is then further mixed with 0.4 part of oxalic acid and worked up to produce a molding powder as described in Example 1.

Example 3

540 parts of urea (9 mol.) and 228 parts of thiourea (3 mol.) are dissolved in 1160 parts of formaldehyde solution of 30 per cent. strength (11.6 mol.) which has previously been neutralized with sodium hydroxide. To this solution a mixture of 163 parts of ammonia solution of 25 per cent. strength (2.4 mol.) and 360 parts of formaldehyde solution of 30 per cent. strength of (3.6 mol.) yielding 0.6 molecular proportion of hexamethylenetetramine is added. After admixture of 1.9 parts of oxalic acid the whole is heated for 2 hours at 60° C. and then distilled under diminished pressure at 60-70° C., until 1000 parts of water have passed over. There is produced a clear solution. If a sample of this is heated for several hours at 120-140° C. it becomes turbid but not hard at this temperature. After cooling, the mass becomes hard and dissolves in water to a turbid solution.

The solution which has been distilled is mixed with 1000 parts of formaldehyde of 30 per cent. strength (10 mol.), allowed to stand, while cooling, for 24 hours and worked up in known manner to form a molding powder.

Example 4

A molding powder having a molecular ratio of urea to formaldehyde=1:1.3 or 1:1.4, made in any of the manners described above and already become capable of hardening owing to the addition of formaldehyde, is comminuted and mixed with so much para-formaldehyde that the final molecular ratio between the urea and the formaldehyde is 1:15. Molded bodies having the properties described in Example 1 are obtained.

What we claim is:—

1. A process for converting condensation products made from urea, formaldehyde and hexamethylenetetramine and incapable of being hardened, into condensation products which are capable of being hardened, comprising reacting one molecular proportion of urea with less than one molecular proportion but not substantially less than ½ molecular proportion of formaldehyde in presence of less than 0.1 molecular proportion but not essentially less than 1/60 molecular proportion of hexamethylenetetramine, and then treating the resultant condensation product with so much formaldehyde that the molecular ratio between urea and formaldehyde ranges from at least 1:1 to about 1:2.

2. A process for converting condensation products made from urea, formaldehyde and hexamethylenetetramine and incapable of being hardened, into condensation products which are capable of being hardened, comprising reacting one molecular proportion of urea with less than one molecular proportion but not substantially less than ½ molecular proportion of formaldehyde in presence of less than 0.1 molecular proportion but not essentially less than 1/60 molecular proportion of hexamethylenetetramine and in presence of an acid yielding substance, and then treating the resultant condensation product with so much formaldehyde that the molecular ratio between urea and formaldehyde ranges from at least 1:1 to about 1:2.

3. A process for converting condensation products made from urea, formaldehyde and hexamethylenetetramine and incapable of being hardened, into condensation products which are capable of being hardened, comprising reacting one molecular proportion of urea with less than one molecular proportion but not substantially less than ½ molecular proportion of formaldehyde in presence of less than 0.1 molecular proportion but not essentially less than 1/60 molecular proportion of hexamethylenetetramine, and then treating the resultant condensation product in presence of an acid yielding substance with so much formaldehyde that the molecular ratio between urea and formaldehyde ranges from at least 1:1 to about 1:2.

4. A process for converting condensation products made from formaldehyde, hexamethylenetetramine and a mixture of urea with a compound selected from the group consisting of thiourea, formamide, acetamide, oxamide, urethane, aniline, phenol and toluene sulfonamide and incapable of being hardened, into condensation products which are capable of being hardened, comprising reacting one molecular proportion of the urea-containing mixture with less than one molecular proportion but not substantially less than ½ molecular proportion of formaldehyde in presence of less than 0.1 molecular proportion but not essentially less than 1/60 molecular proportion of hexamethylenetetramine, and then treating the resulting condensation product with so much formaldehyde that the molecular ratio between the components of the urea-containing mixture and formaldehyde ranges from at least 1:1 to about 1:2.

WILHELM KRAUS.
WILLI FISCH.